(12) United States Patent
Hayashi et al.

(10) Patent No.: US 11,378,095 B2
(45) Date of Patent: Jul. 5, 2022

(54) CENTRIFUGAL COMPRESSOR AND TURBOCHARGER

(71) Applicant: MITSUBISHI HEAVY INDUSTRIES ENGINE & TURBOCHARGER, LTD., Sagamihara (JP)

(72) Inventors: Yoshihiro Hayashi, Tokyo (JP); Yutaka Fujita, Tokyo (JP); Kenichiro Iwakiri, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/042,661

(22) PCT Filed: Jul. 13, 2018

(86) PCT No.: PCT/JP2018/026549
§ 371 (c)(1),
(2) Date: Sep. 28, 2020

(87) PCT Pub. No.: WO2020/012648
PCT Pub. Date: Jan. 16, 2020

(65) Prior Publication Data
US 2021/0033103 A1 Feb. 4, 2021

(51) Int. Cl.
*F04D 29/42* (2006.01)
*F04D 29/44* (2006.01)
*F04D 17/10* (2006.01)

(52) U.S. Cl.
CPC ....... *F04D 29/4213* (2013.01); *F04D 29/441* (2013.01); *F04D 17/10* (2013.01);
(Continued)

(58) Field of Classification Search
CPC ............. F04D 29/4213; F04D 29/4226; F04D 29/684; F05D 2250/51
See application file for complete search history.

(56) References Cited

U.S. PATENT DOCUMENTS 8,287,232 B2 * 10/2012 Gu ................. F04D 27/0223
415/56.5
8,522,549 B2 * 9/2013 Sumser ............. F04D 29/685
60/605.1
(Continued)

FOREIGN PATENT DOCUMENTS

DE 10 2013 204 082 A1 9/2013
DE 10 2015 215 246 A1 2/2017
(Continued)

OTHER PUBLICATIONS

International Preliminary Report on Patentability and Written Opinion of the International Searching Authority for International Application No. PCT/JP2018/026549, dated Jan. 28, 2021, with an English translation.
(Continued)

*Primary Examiner* — Ninh H. Nguyen
(74) *Attorney, Agent, or Firm* — Birch, Stewart, Kolasch & Birch, LLP

(57) ABSTRACT

A centrifugal compressor includes an impeller, a compressor inlet pipe for guiding air to the impeller, a scroll passage disposed on an outer peripheral side of the impeller, and a bypass passage connecting the compressor inlet pipe and the scroll passage and bypassing the impeller. In a cross-section perpendicular to an axis of the compressor inlet pipe, when A1 is a connection portion on a downstream side in a rotational direction of the impeller of connection portions between an inner wall surface of the compressor inlet pipe and an inner wall surface of the bypass passage, C is a virtual circle constituting the inner wall surface of the compressor inlet pipe, and L1 is a tangent line of the virtual circle C at the connection portion A1, the inner wall surface of the bypass passage is formed from the connection portion A1 along the tangent line L1.

17 Claims, 16 Drawing Sheets

(52) U.S. Cl.
CPC ...... *F04D 29/4253* (2013.01); *F05D 2220/40* (2013.01); *F05D 2250/51* (2013.01)

(56) References Cited

U.S. PATENT DOCUMENTS

| | | | |
|---|---|---|---|
| 9,482,240 B2 * | 11/2016 | Gerard | ................. F04D 29/685 |
| 2012/0073287 A1 | 3/2012 | Kang et al. | |
| 2013/0232971 A1 | 9/2013 | Miazgowicz et al. | |
| 2014/0069096 A1 | 3/2014 | Murayama | |
| 2016/0131148 A1 * | 5/2016 | Murayama | ............ F04D 29/681 |
| | | | 415/58.4 |
| 2018/0058309 A1 | 3/2018 | Ehrmann et al. | |
| 2020/0040855 A1 | 2/2020 | Uehane et al. | |

FOREIGN PATENT DOCUMENTS

| | | |
|---|---|---|
| JP | 61-57137 U | 4/1986 |
| JP | 11-182257 A | 7/1999 |
| JP | 2005-240569 A | 9/2005 |
| JP | 2005-351193 A | 12/2005 |
| JP | 2012-62822 A | 3/2012 |
| JP | 2012-241558 A | 12/2012 |
| JP | 2012-241560 A | 12/2012 |
| JP | 2017-155664 A | 9/2017 |
| WO | WO 2012/030776 A2 | 3/2012 |
| WO | WO 2018/069975 A1 | 4/2018 |

OTHER PUBLICATIONS

International Search Report for International Application No. PCT/JP2018/026549, dated Aug. 28. 2018.

Office Action dated Jun. 26, 2021 issued in counterpart Japanese Application No. 2020-529957 with Machine Translation.

Extended European Search Report for European Application No. 18925758.7, dated Dec. 8, 2020.

Office Action (Reconsideration Report by Examiner before Appeal dated Dec. 10, 2021, issued in Counterpart Japanese Application No. 2020-529957 with a Machine Translation.

Office Action dated May 24, 2022 issued in counterpart Japanese Application No. 2020-529957 with an English Translation.

* cited by examiner

CENTRIFUGAL COMPRESSOR AND TURBOCHARGER

TECHNICAL FIELD

The present disclosure relates to a centrifugal compressor and a turbocharger.

BACKGROUND ART

In a turbocharger used in, for example, passenger cars, a bypass valve may be used as a device for avoiding surging caused by a rapid decrease in flow rate during engine deceleration. In this case, the bypass valve is provided on a bypass passage that connects a compressor inlet pipe and a scroll passage, and the bypass valve is opened at an operating point at a high pressure ratio near the surge line to reduce the boost pressure and ensure a predetermined surge margin.

The provision of the bypass valve enables active control near the surge line but causes additional flow loss at a branch portion formed between the scroll passage and the bypass passage.

Patent Document 1 proposes that the surface of the valve body of the bypass valve is shaped along the inner wall of the scroll passage of the compressor. With this structure, it is possible to suppress an increase in pressure loss due to the flow into the bypass passage at the branch portion from the scroll passage to the bypass passage.

CITATION LIST

Patent Literature

Patent Document 1: JP2012-241558A

SUMMARY

Problems to be Solved

FIG. 10 shows the axial velocity distribution and the flow direction near the surge line in a cross-section perpendicular to the axis of the compressor inlet pipe. In FIG. 10, when the axial velocity has a positive value, it means that a fluid flows toward the impeller, and when the axial velocity has a negative value, it means that a fluid flows back away from the impeller. As a result of investigation by the present inventors, it has been found that, as shown in FIG. 10, the backflow from the impeller impinges on the bypass passage in the vicinity of the connection between the compressor inlet pipe and the bypass passage with swirl components in the rotational direction of the impeller, and this impingement causes local deceleration, which distorts the velocity distribution and forms a non-axisymmetric flow.

This non-axisymmetric flow causes variation in flow loss between blades of the impeller as shown in FIG. 11, so that some of the blades operate at an operating point largely deviated from the design point. As a result, the pressure loss in a rotation region of the impeller increases, and the compressor efficiency is reduced.

In the centrifugal compressor disclosed in Patent Document 1, the reduction in compressor efficiency can be suppressed by controlling the pressure loss at the branch portion from the scroll passage to the bypass passage, but Patent Document 1 does not disclose how the connection portion between the bypass passage and the compressor inlet pipe is configured in order to suppress the reduction in compressor efficiency.

At least one embodiment of the present invention was achieved in view of the above-described typical problem, and an object thereof is to provide a centrifugal compressor and a turbocharger whereby it is possible to suppress a reduction in compressor efficiency due to the configuration of the connection portion between the bypass passage and the compressor inlet pipe.

Solution to the Problems (1) A centrifugal compressor according to at least one embodiment of the present invention comprises: an impeller; a compressor inlet pipe for guiding air to the impeller; a scroll passage disposed on an outer peripheral side of the impeller; and a bypass passage connecting the compressor inlet pipe and the scroll passage and bypassing the impeller. In a cross-section perpendicular to an axis of the compressor inlet pipe, when A1 is a connection portion on a downstream side in a rotational direction of the impeller of connection portions between an inner wall surface of the compressor inlet pipe and an inner wall surface of the bypass passage, C is a virtual circle constituting the inner wall surface of the compressor inlet pipe, and L1 is a tangent line of the virtual circle C at the connection portion A1, the inner wall surface of the bypass passage is formed from the connection portion A1 along the tangent line L1.

With the centrifugal compressor described in the above (1), since the inner wall surface of the bypass passage is formed from the connection portion A1 on the downstream side in the rotational direction of the impeller along the tangent line L1 in a cross-section perpendicular to the axis of the compressor inlet pipe, the inner wall surface of the bypass passage is formed along the swirling flow (swirl) flowing back from the impeller in an operating region near the surge line. Accordingly, as compared with the case where the inner wall surface of the bypass passage is not along the tangent line L1 at the connection portion A1, it is possible to suppress local deceleration of the swirling flow flowing back from the impeller due to impingement of the swirling flow on the inner wall surface of the bypass passage. As a result, the flow distortion in the circumferential direction of the compressor inlet pipe is suppressed, and the uniformity of the velocity distribution in the circumferential direction is improved. Thus, since the variation in flow loss between blades of the impeller is reduced, it is possible to suppress a reduction in compressor efficiency.

(2) In some embodiments, in the centrifugal compressor described in the above (1), when B is a virtual line connecting centers of gravity of cross-sections of the bypass passage in a flow direction of the bypass passage, and in a cross-section perpendicular to the axis of the compressor inlet pipe, P1 is an intersection between the virtual circle C and the virtual line B, L2 is a tangent line of the virtual line B at the intersection P1, L3 is a straight line passing through the axis of the compressor inlet pipe and parallel to the tangent line L2, and P2 is an intersection between the virtual circle C and the straight line L3, the intersection P1 is positioned downstream of the intersection P2 in the rotational direction of the impeller.

With the centrifugal compressor described in the above (2), since the bypass passage is easily configured such that the inner wall surface of the bypass passage is formed from the connection portion A1 along the tangent line L1, it is possible to suppress a reduction in compressor efficiency while reducing complication of the configuration of the bypass passage.

Further, in a cross-section perpendicular to the axis of the compressor inlet pipe, when A2 is a connection portion on an upstream side in the rotational direction of the impeller of the connection portions between the inner wall surface of the compressor inlet pipe and the inner wall surface of the bypass passage, L4 is a tangent line of the virtual circle C at the connection portion A2, and θ2 is an angle between the inner wall surface 24 of the bypass passage 16 and the tangent line L4 at the connection portion A2, the angle θ2 is easily increased by positioning the intersection P1 downstream of the intersection P2 in the rotational direction of the impeller. Thus, it is possible to prevent the entry of the swirling flow flowing back from the impeller into the bypass passage, and effectively suppress a reduction in compressor efficiency.

(3) In some embodiments, in the centrifugal compressor described in the above (1) or (2), when, in a cross-section perpendicular to the axis of the compressor inlet pipe, P1 is an intersection between the virtual circle C and the virtual line B, and A2 is a connection portion on an upstream side in the rotational direction of the impeller of connection portions between the virtual circle C and the inner wall surface of the bypass passage, a distance d1 from the connection portion A1 to the intersection P1 along the virtual circle is greater than a distance d2 from the connection portion A2 to the intersection P1 along the virtual circle.

With the centrifugal compressor described in the above (3), since the bypass passage is easily configured such that the inner wall surface of the bypass passage is formed from the connection portion A1 along the tangent line L1, it is possible to suppress a reduction in compressor efficiency while reducing complication of the configuration of the bypass passage.

Further, in a cross-section perpendicular to the axis of the compressor inlet pipe, when A2 is a connection portion on an upstream side in the rotational direction of the impeller of the connection portions between the inner wall surface of the compressor inlet pipe and the inner wall surface of the bypass passage, L4 is a tangent line of the virtual circle C at the connection portion A2, and θ2 is an angle between the inner wall surface 24 of the bypass passage 16 and the tangent line L4 at the connection portion A2, the angle θ2 is easily increased by making the distance d1 greater than the distance d2 as described above. Thus, it is possible to prevent the entry of the swirling flow flowing back from the impeller into the bypass passage, and effectively suppress a reduction in compressor efficiency.

(4) In some embodiments, in the centrifugal compressor described in any one of the above (1) to (3), in a cross-section perpendicular to the axis of the compressor inlet pipe, an angle θ1 between the inner wall surface of the bypass passage and the tangent line L1 at the connection portion A1 satisfies 0°≤θ1≤45°.

With the centrifugal compressor described in the above (4), since the bypass passage is configured such that the angle θ1 between the inner wall surface of the bypass passage and the tangent line L1 at the connection portion A1 satisfies 0°≤θ1≤45°, the inner wall surface of the bypass passage is formed along the swirling flow (swirl) flowing back from the impeller in an operating region near the surge line.

Accordingly, as compared with the case where 45°≤θ1≤90°, it is possible to suppress local deceleration of the swirling flow flowing back from the impeller due to impingement of the swirling flow on the inner wall surface of the bypass passage. As a result, the flow distortion in the circumferential direction of the compressor inlet pipe is suppressed, and the uniformity of the velocity distribution in the circumferential direction is improved. Thus, since the variation in flow loss between blades of the impeller is reduced, it is possible to suppress a reduction in compressor efficiency.

(5) In some embodiments, in the centrifugal compressor described in any one of the above (1) to (4), in a cross-section perpendicular to the axis of the compressor inlet pipe, when θ1 is an angle between the inner wall surface of the bypass passage and the tangent line L1 at the connection portion A1, A2 is a connection portion on an upstream side in the rotational direction of the impeller of connection portions between the virtual circle C and the inner wall surface of the bypass passage, L4 is a tangent line of the virtual circle at the connection portion A2, and θ2 is an angle between the inner wall surface of the bypass passage and the tangent line L4 at the connection portion A2, θ1<θ2 is satisfied.

With the centrifugal compressor described in the above (5), since the angle θ1 between the inner wall surface and the tangent line L1 at the connection portion A1 is smaller than the angle θ2 between the inner wall surface and the tangent line L4 at the connection portion A2, it is possible to suppress local deceleration of the swirling flow flowing back from the impeller, and prevent the entry of the swirling flow into the bypass passage, in an operating region near the surge line, as described above. Consequently, it is possible to effectively suppress a reduction in centrifugal compressor efficiency.

(6) In some embodiments, in the centrifugal compressor described in any one of the above (1) to (5), in a cross-section perpendicular to the axis of the compressor inlet pipe, when A2 is a connection portion on an upstream side in the rotational direction of the impeller of connection portions between the virtual circle C and the inner wall surface of the bypass passage, and L4 is a tangent line of the virtual circle at the connection portion A2, an angle θ2 between the inner wall surface of the bypass passage and the tangent line L4 satisfies 45°≤θ2≤90°.

With the centrifugal compressor described in the above (6), since the angle θ2 between the inner wall surface of the bypass passage and the tangent line L4 at the connection portion A2 is equal to or greater than 45° and close to the right angle, it is possible to effectively prevent the entry of the swirling flow flowing back from the impeller into the bypass passage in an operating region near the surge line. Consequently, it is possible to effectively suppress a reduction in centrifugal compressor efficiency.

(7) In some embodiments, in the centrifugal compressor described in any one of the above (1) to (6), when B is a virtual line connecting centers of gravity of cross-sections of the bypass passage in a flow direction of the bypass passage, in a cross-section perpendicular to a rotational axis of the impeller, P1 is an intersection between the virtual circle C and the virtual line B, and L2 is a tangent line of the virtual line B at the intersection P1, and in a meridian plane of the centrifugal compressor, P3 is an intersection between the axis O1 of the compressor inlet pipe and the tangent line L2, L5 is a line segment of the axis O1 of the compressor inlet pipe extending from the intersection P3 upstream in a flow direction of the compressor inlet pipe, and L6 is a half-line of the tangent line L2 extending from the intersection P3 into the bypass passage, an angle $\theta 3$ between the line segment L5 and the half-line L6 at the intersection P3 is equal to or greater than 90°.

With the centrifugal compressor described in the above (7), as compared with a conventional embodiment where the angle $\theta 3$ is smaller than 90°, the entry of the swirling flow flowing back from the impeller into the bypass passage is prevented in an operating region near the surge line. Thus, it is possible to reduce pressure loss in a region in the vicinity of the connection portion between the compressor inlet pipe and the bypass passage.

Conventionally, the angle $\theta 3$ is set to be smaller than 90° in order to prevent the forward flow toward the impeller in the compressor inlet pipe from interfering with the bypass passage. However, as a result of studies by the inventors, it has been found that it is preferred in terms of the compressor efficiency to set the angle $\theta 3$ related to the bypass passage to be equal to or greater than 90° as described in the above (7) in order to prevent the entry of the swirling flow flowing back from the impeller into the bypass passage near the surge line, rather than set the angle $\theta 3$ to be smaller than 90° in order to prevent the forward flow toward the impeller from interfering with the bypass passage.

(8) A centrifugal compressor according to at least one embodiment of the present invention comprises: an impeller; a compressor inlet pipe for guiding air to the impeller; a scroll passage disposed on an outer peripheral side of the impeller; and a bypass passage connecting the compressor inlet pipe and the scroll passage and bypassing the impeller. When B is a virtual line connecting centers of gravity of cross-sections of the bypass passage in a flow direction of the bypass passage, in a cross-section perpendicular to a rotational axis of the impeller, C is a virtual circle constituting an inner wall surface of the compressor inlet pipe, P1 is an intersection between the virtual circle C and the virtual line B, and L2 is a tangent line of the virtual line B at the intersection P1, and in a meridian plane of the centrifugal compressor, P3 is an intersection between the axis O1 of the compressor inlet pipe and the tangent line L2, L5 is a line segment of the axis O1 of the compressor inlet pipe extending from the intersection P3 upstream in a flow direction of the compressor inlet pipe, and L6 is a half-line of the tangent line L2 extending from the intersection P3 into the bypass passage, an angle $\theta 3$ between the line segment L5 and the half-line L6 at the intersection P3 satisfies 90°<$\theta 3$.

With the centrifugal compressor described in the above (8), as compared with a conventional embodiment where the angle $\theta 3$ is smaller than 90°, the angle $\theta 3$ is set so as to prevent the entry of the swirling flow flowing back from the impeller into the bypass passage in an operating region near the surge line, and the distance between the impeller and the connection port of the bypass passage on the inner wall surface of the compressor inlet pipe is easily ensured. Thus, it is possible to prevent the entry of the swirling flow flowing back from the impeller into the bypass passage in an operating region near the surge line, and reduce pressure loss in a region in the vicinity of the connection portion between the compressor inlet pipe and the bypass passage.

Conventionally, the angle $\theta 3$ is set to be smaller than 90° in order to prevent the forward flow toward the impeller in the compressor inlet pipe from interfering with the bypass passage. However, as a result of studies by the inventors, it has been found that it is preferred in terms of the compressor efficiency to set the angle $\theta 3$ related to the bypass passage to be greater than 90° as described in the above (8) in order to prevent the entry of the swirling flow flowing back from the impeller into the bypass passage near the surge line, rather than set the angle $\theta 3$ to be smaller than 90° in order to prevent the forward flow toward the impeller from interfering with the bypass passage.

(9) In some embodiments, in the centrifugal compressor described in the above (8), the angle $\theta 3$ satisfies $\theta 3 \leq 135°$.

With the centrifugal compressor described in the above (9), it is possible to prevent the entry of the swirling flow flowing back from the impeller into the bypass passage near the surge line, without excessively increasing the influence of interference of the forward flow toward the impeller in the compressor inlet pipe with the bypass passage. Accordingly, it is possible to achieve a high compressor efficiency.

(10) In some embodiments, the centrifugal compressor described in the above (8) or (9) further comprises at least one extension part disposed between a leading edge of a blade of the impeller and a connection port of the bypass passage formed on the compressor inlet pipe in an axial direction of the compressor inlet pipe, the at least one extension part extending along a direction parallel to the axis O1 so as to protrude from the inner wall surface of the compressor inlet pipe inward in a radial direction of the compressor inlet pipe.

With the centrifugal compressor described in the above (10), the extension part prevents the entry of the swirling flow flowing back from the impeller into the bypass passage near the surge line. Further, since the extension part extends along the direction parallel to the axis O1, the forward flow toward the impeller in the compressor inlet pipe smoothly flows along the extension part. Thus, it is possible to effectively reduce pressure loss in a region in the vicinity of the connection portion between the compressor inlet pipe and the bypass passage.

(11) In some embodiments, in the centrifugal compressor described in the above (10), the at least one extension part includes a plurality of extension parts arranged at intervals in a circumferential direction of the compressor inlet pipe.

With the centrifugal compressor described in the above (11), the plurality of extension parts effectively prevents the entry of the swirling flow flowing back from the impeller into the bypass passage near the surge line.

(12) In some embodiments, in the centrifugal compressor described in the above (10) or (11), each extension part is formed in a plate shape.

With the centrifugal compressor described in the above (12), the plate-shaped extension part effectively prevents the entry of the swirling flow flowing back from the impeller into the bypass passage near the surge line.

(13) In some embodiments, the centrifugal compressor described in any one of the above (8) to (12) comprises an annular protruding part protruding downstream in the flow direction of the compressor inlet pipe from an upstream part of the inner wall surface of the compressor inlet pipe upstream of a connection port of the bypass passage in the flow direction.

With the centrifugal compressor described in the above (13), the flow (re-circulation flow) flowing out from the bypass passage into the compressor inlet pipe via the connection port is turned by the annular protruding part and flows along the inner wall surface of the compressor inlet pipe. Thus, it is possible to suppress the backflow from the impeller near the surge line.

(14) In some embodiments, in the centrifugal compressor described in the above (13), the protruding part is disposed so as to overlap at least a part of the connection port when viewed in a radial direction of the compressor inlet pipe.

With the centrifugal compressor described in the above (14), the flow (re-circulation flow) flowing out from the bypass passage into the compressor inlet pipe via the connection port is effectively turned by the annular protruding part and flows along the inner wall surface of the compressor inlet pipe. Thus, it is possible to effectively suppress the backflow from the impeller near the surge line.

(15) A turbocharger according to at least one embodiment of the present invention comprises: the centrifugal compressor described in any one of the above (1) to (14) and a turbine sharing a rotational shaft with the impeller of the centrifugal compressor.

According to the turbocharger described in the above (15), since the centrifugal compressor described in any one of the above (1) to (14) is included, the flow distortion in the circumferential direction of the compressor inlet pipe is suppressed, and the uniformity of the velocity distribution in the circumferential direction is improved. Thus, since the variation in flow loss between blades of the impeller is reduced, it is possible to suppress a reduction in compressor efficiency. Consequently, it is possible to suppress a reduction in turbocharger efficiency.

Advantageous Effects

At least one embodiment of the present invention provides a centrifugal compressor and a turbocharger whereby it is possible to suppress a reduction in compressor efficiency due to the configuration of the connection portion between the bypass passage and the compressor inlet pipe.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
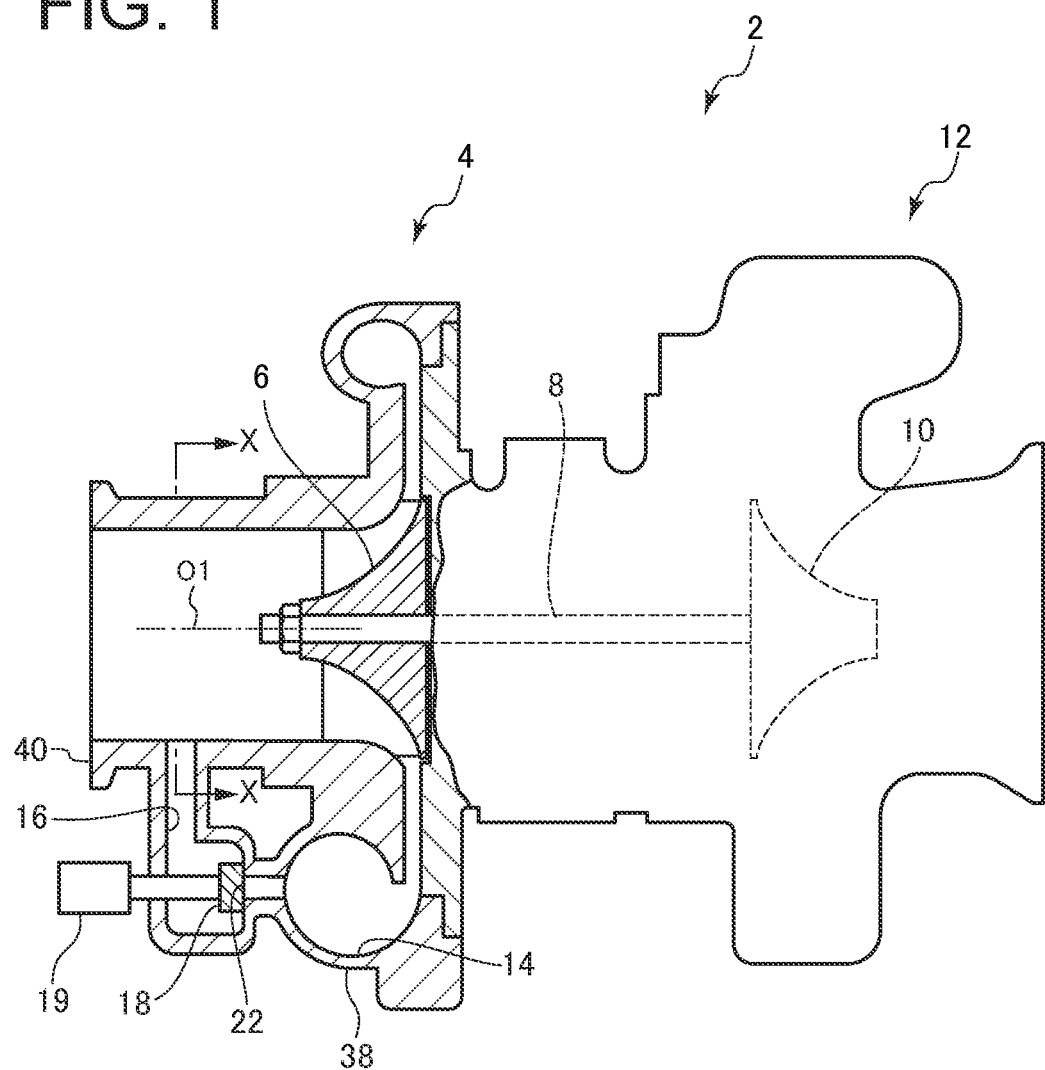
FIG. 1 is a partial cross-sectional view showing a schematic configuration of a turbocharger 2 according to an embodiment.

FIG. 1 is a partial cross-sectional view showing a schematic configuration of a turbocharger 2 according to an embodiment.

As shown in FIG. 1, the turbocharger 2 includes a centrifugal compressor 4 and a turbine 12 including a turbine rotor 10 sharing a rotational shaft 8 with an impeller 6 of the centrifugal compressor 4.

The centrifugal compressor 4 includes an impeller 6, a compressor inlet pipe 40 for guiding air to the impeller 6, a scroll passage 14 disposed on the outer peripheral side of the impeller 6, a bypass passage 16 connecting the compressor inlet pipe 40 and an outlet pipe 38 of the scroll passage 14 and bypassing the impeller 6, and a bypass valve 18 capable of opening and closing a valve port 22 disposed on the bypass passage 16. The opening and closing operation of the bypass valve 18 is controlled by an actuator 19. When the discharge pressure of the centrifugal compressor 4 excessively increases, the valve opens to flow a part of the compressed air in the scroll passage 14 back to the compressor inlet pipe 40.

Figure 2:
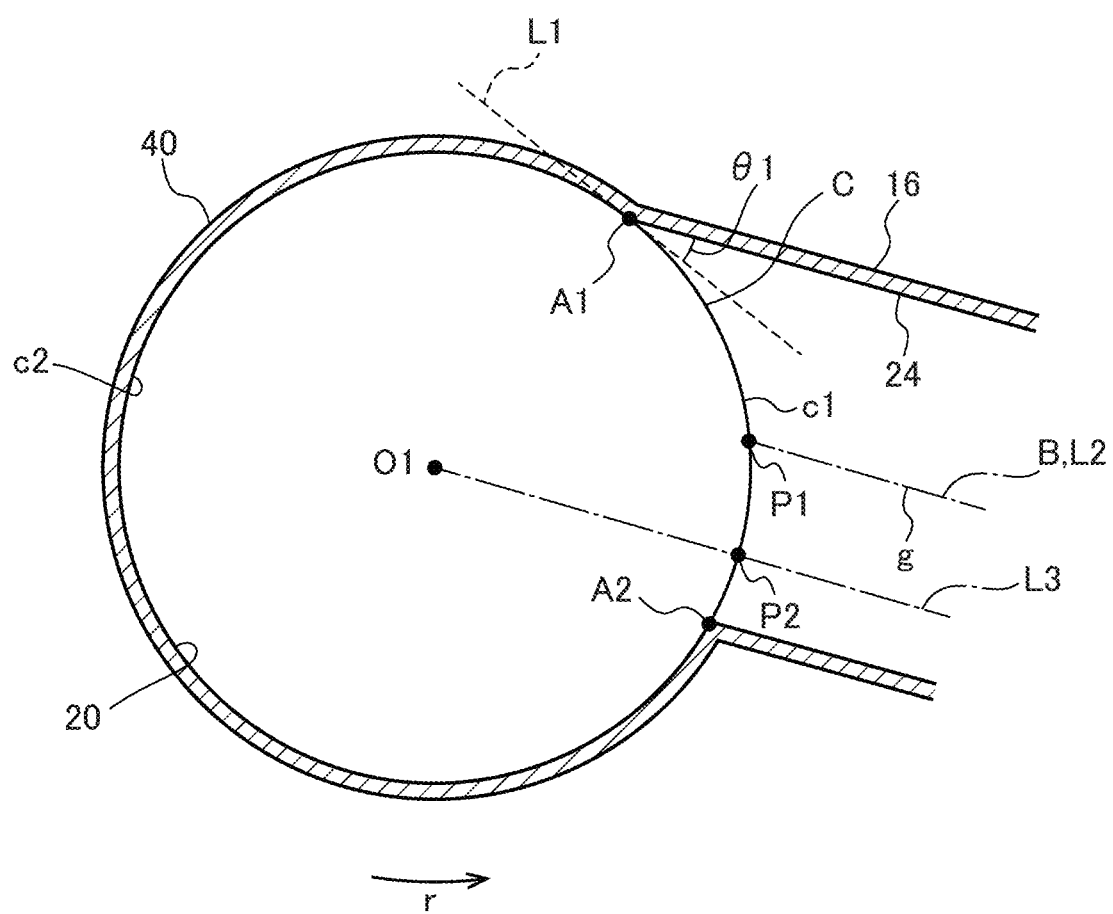
FIG. 2 is a diagram schematically showing an example of X-X cross-section (cross-section perpendicular to axis O1 of compressor inlet pipe 40) of the centrifugal compressor 4 shown in FIG. 1.
Figure 3:
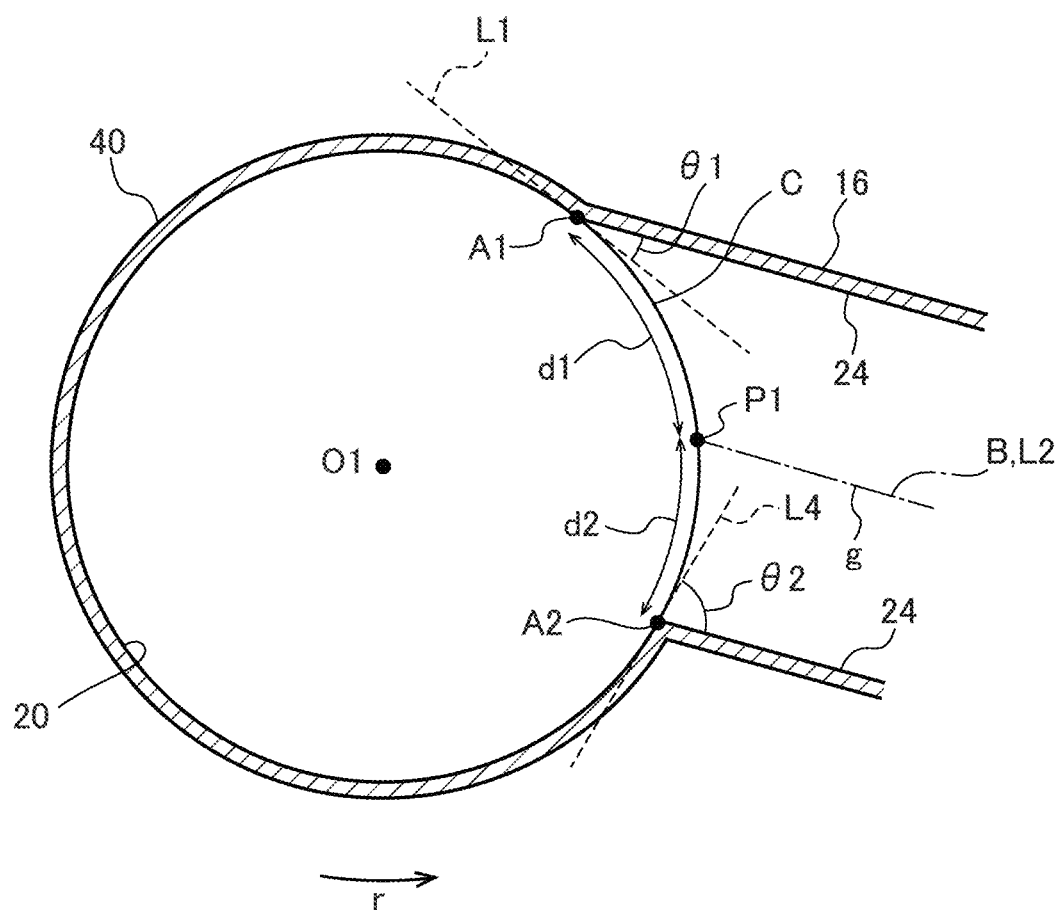
FIG. 3 is a diagram schematically showing an example of X-X cross-section (cross-section perpendicular to axis O1 of compressor inlet pipe 40) of the centrifugal compressor 4 shown in FIG. 1.
Figure 4:
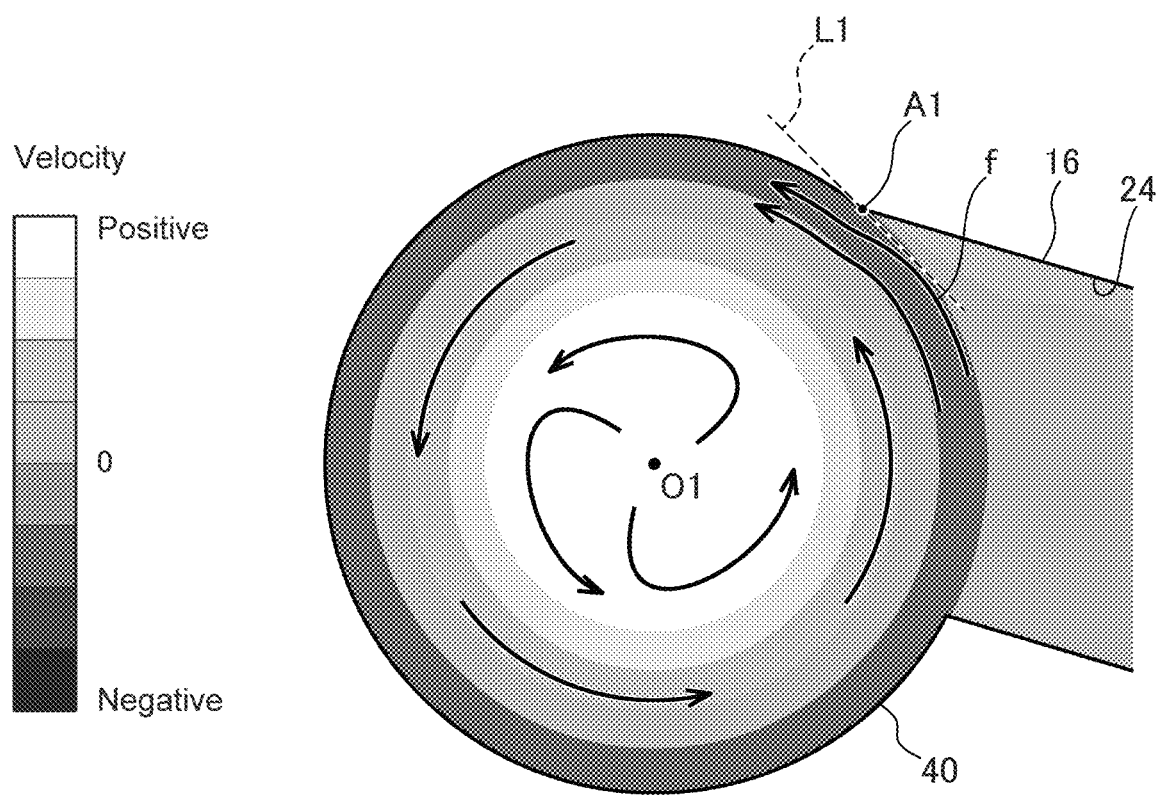
FIG. 4 is a diagram showing the axial velocity distribution and the flow direction at an operating point near the surge line in the X-X cross-section of the centrifugal compressor 4 shown in FIGS. 2 and 3.

FIG. 2 is a diagram schematically showing an example of X-X cross-section (cross-section perpendicular to axis O1 of compressor inlet pipe 40) of the centrifugal compressor 4 shown in FIG. 1. FIG. 3 is a diagram schematically showing an example of X-X cross-section (cross-section perpendicular to axis O1 of compressor inlet pipe 40) of the centrifugal compressor 4 shown in FIG. 1. FIG. 4 is a diagram showing the axial velocity distribution and the flow direction at an operating point near the surge line in the X-X cross-section of the centrifugal compressor 4 shown in FIGS. 2 and 3. In FIG. 4, when the axial velocity has a positive value, it means that a fluid flows toward the impeller 6, and when the axial velocity has a negative value, it means that a fluid flows back away from the impeller 6.

In an embodiment, for example as shown in FIG. 2, in a cross-section perpendicular to the axis O1 of the compressor inlet pipe 40, when A1 is a connection portion on the downstream side in the rotational direction r of the impeller of connection portions A1, A2 between an inner wall surface 20 of the compressor inlet pipe 40 and an inner wall surface 24 of the bypass passage 16, A2 is a connection portion on the upstream side in the rotational direction r of the impeller of the connection portions A1, A2 between the inner wall surface 20 of the compressor inlet pipe 40 and the inner wall surface 24 of the bypass passage 16, C is a virtual circle constituting the inner wall surface 20 of the compressor inlet pipe 40, and L1 is a tangent line of the virtual circle C at the connection portion A1, the inner wall surface 24 of the bypass passage 16 is formed from the connection portion A1 along the tangent line L1.

Herein, the expression that the inner wall surface 24 is "formed along the tangent line L1" in a cross-section perpendicular to the axis O1 of the compressor inlet pipe 40 includes not only the case where the inner wall surface 24 is parallel to the tangent line L1, but also the case where the inner wall surface 24 is approximately parallel to the tangent line L1 (for instance, angle θ1 between tangent line L1 and inner wall surface 24 satisfies) 0°≤θ1≤45°. Further, the expression "connection portion A1 on the downstream side in the rotational direction r of the impeller of the connection portions A1, A2" means, when the virtual circle C is divided into an arc c1 that is in the bypass passage 16 and an arc c2 that corresponds to the inner wall surface 20 of the bypass passage 16, a downstream end of the arc c1 in the rotational direction r. Further, the expression "connection portion A1 on the upstream side in the rotational direction r of the impeller of the connection portions A1, A2" means an upstream end of the arc c1 in the rotational direction r.

Figure 10:
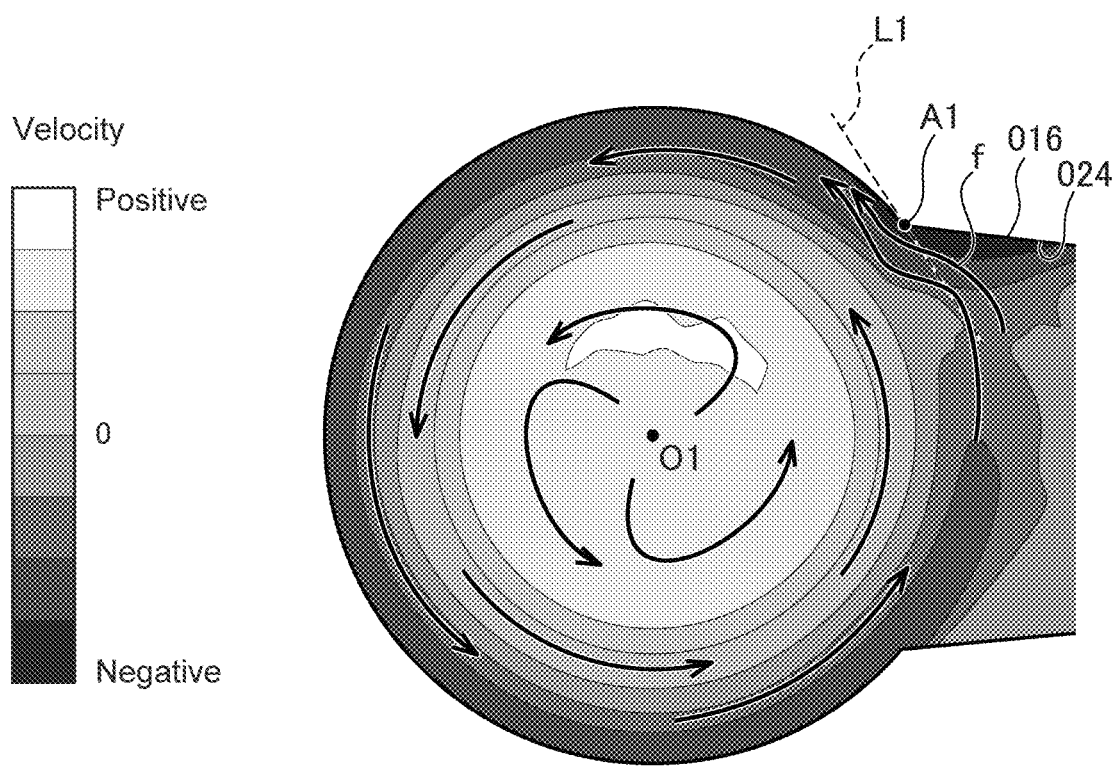
FIG. 10 is a diagram showing the axial velocity distribution and the flow direction at an operating point near the surge line in a cross-section perpendicular to the axis O1 of the centrifugal compressor according to a comparative embodiment.
Figure 11:
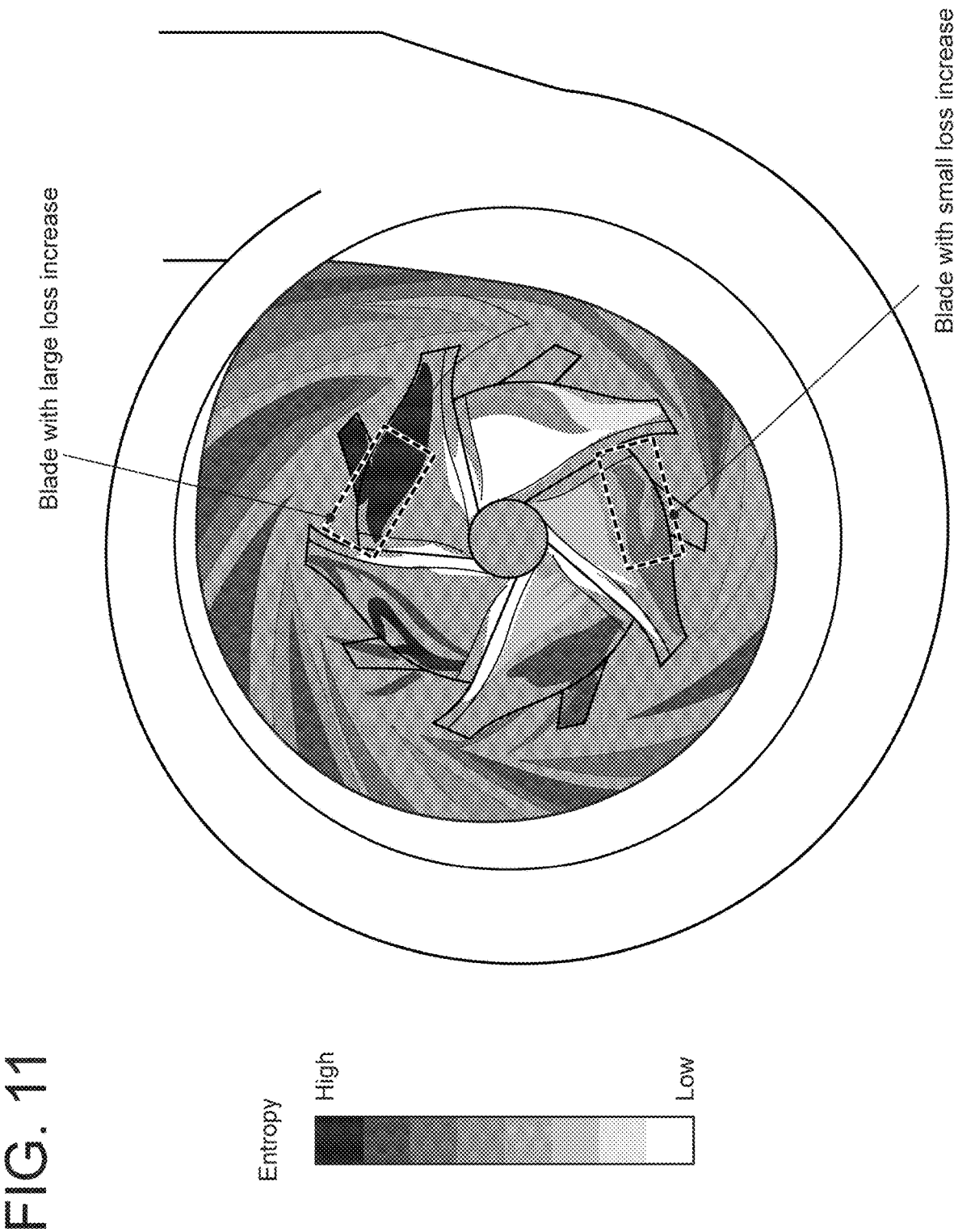
FIG. 11 is a diagram showing a non-uniform load distribution among the blades of the impeller 6.

As described above, when the inner wall surface 24 of the bypass passage 16 is formed from the connection portion A1 on the downstream side in the rotational direction r of the impeller 6 along the tangent line L1 in a cross-section perpendicular to the axis O1 of the compressor inlet pipe 40, as shown in FIG. 4, the inner wall surface 24 of the bypass passage 16 is formed along the swirling flow f (swirl) flowing back from the impeller 6. Accordingly, as compared with the comparative example shown in FIG. 10 where the inner wall surface 024 of the bypass passage 016 is not along the tangent line L1, it is possible to suppress local deceleration of the swirling flow f flowing back from the impeller 6 due to impingement of the swirling flow f on the inner wall surface 24 of the bypass passage 16. As a result, as shown in FIG. 4, the flow distortion in the circumferential direction of the compressor inlet pipe 40 is suppressed, and the uniformity of the velocity distribution in the circumferential direction is improved. Thus, since the variation in flow loss between blades of the impeller 6 is reduced, it is possible to suppress a reduction in compressor efficiency.

In some embodiments, for example as shown in FIG. 3, in a cross-section perpendicular to the axis O1 of the compressor inlet pipe 40, when L4 is a tangent line of the virtual circle C at the connection portion A2 between the inner wall surface 20 of the compressor inlet pipe 40 and the inner wall surface 24 of the bypass passage 16, and θ2 is an angle between the inner wall surface 24 of the bypass passage 16 and the tangent line L4 at the connection portion A2, θ1<θ2 is satisfied.

With the above configuration, since the angle θ1 between the inner wall surface 24 and the tangent line L1 at the connection portion A1 is smaller than the angle θ2 between the inner wall surface 24 and the tangent line L4 at the connection portion A2, it is possible to suppress local deceleration of the swirling flow f flowing back from the impeller 6 due to impingement of the swirling flow f on the inner wall surface 24 of the bypass passage 16, and prevent the entry of the swirling flow f into the bypass passage 16. Consequently, it is possible to effectively suppress a reduction in efficiency of the centrifugal compressor 4.

In some embodiments, for example as shown in FIG. 3, in a cross-section perpendicular to the axis O1 of the compressor inlet pipe 40, the angle θ2 between the inner wall surface 24 and the tangent line L4 at the connection portion A2 satisfies 45°≤θ2<90°.

With the above configuration, since the angle θ2 between the inner wall surface 24 and the tangent line L4 at the connection portion A2 is equal to or greater than 45° and close to the right angle, it is possible to effectively prevent the entry of the swirling flow f flowing back from the impeller 6 into the bypass passage 16 in an operating region near the surge line. Consequently, it is possible to effectively suppress a reduction in efficiency of the centrifugal compressor 4.

Here, for example as shown in FIG. 2, B is a virtual line connecting centers of gravity g of cross-sections of the bypass passage 16 in the flow direction of the bypass passage 16. Further, in a cross-section perpendicular to the axis O1 of the compressor inlet pipe 40, P1 is an intersection between the virtual circle C and the virtual line B, L2 is a tangent line of the virtual line B at the intersection P1 (when the virtual line B is linear, L2 is a straight line including the virtual line B and the extension thereof), L3 is a straight line passing through the axis O1 of the compressor inlet pipe 40 and parallel to the tangent line L2, and P2 is an intersection between the virtual circle C and the straight line L3.

In some embodiments, for example as shown in FIG. 2, the intersection P1 is positioned downstream of the intersection P2 in the rotational direction r of the impeller 6. In other words, in the centrifugal compressor shown in FIG. 2, at the connection portion between the compressor inlet pipe 40 and the bypass passage 16, the center of gravity g of a cross-section of the bypass passage 16 is eccentric to the downstream side in the rotation direction r of the impeller 6 with respect to the axis O1 of the compressor inlet pipe 40.

With the above configuration, since the bypass passage 16 is easily configured such that the inner wall surface 24 of the bypass passage 16 is formed from the connection portion A1 along the tangent line L1, it is possible to suppress a reduction in compressor efficiency while reducing complication of the configuration of the bypass passage 16. Further, when the intersection P1 is positioned downstream of the intersection P2 in the rotational direction r of the impeller 6, the angle θ2 between the inner wall surface 24 and the tangent line L4 at the connection portion A2 can be easily increased. Thus, it is possible to effectively prevent the entry of the swirling flow f flowing back from the impeller 6 into the bypass passage 16, and effectively suppress a reduction in compressor efficiency.

In some embodiments, for example as shown in FIG. 3, in a cross-section perpendicular to the axis O1 of the compressor inlet pipe 40, the distance d1 from the connection portion A1 to the intersection P1 along the virtual circle C is greater than the distance d2 from the connection portion A2 to the intersection P1 along the virtual circle C.

With the above configuration, since the bypass passage 16 is easily configured such that the inner wall surface 24 of the bypass passage 16 is formed from the connection portion A1 along the tangent line L1, it is possible to suppress a reduction in compressor efficiency while reducing complication of the configuration of the bypass passage 16. Further, when the distance d1 is greater than the distance d2, the angle $\theta 2$ between the inner wall surface 24 and the tangent line L4 at the connection portion A2 can be easily increased. Thus, it is possible to effectively prevent the entry of the swirling flow f flowing back from the impeller 6 into the bypass passage 16, and effectively suppress a reduction in compressor efficiency.

Figure 5:
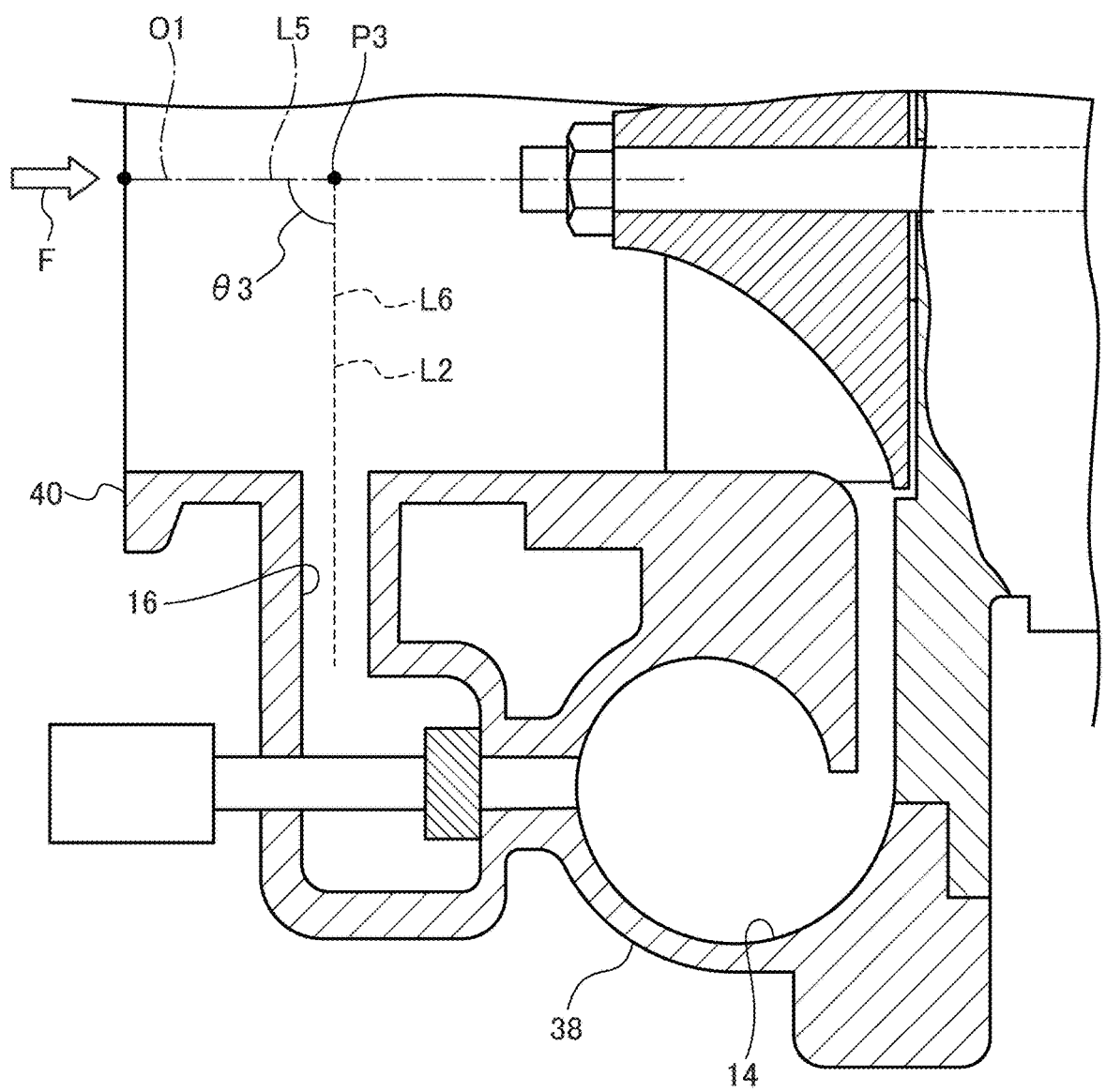
FIG. 5 is a partial enlarged view of the centrifugal compressor 4 shown in FIG. 1.
Figure 6:
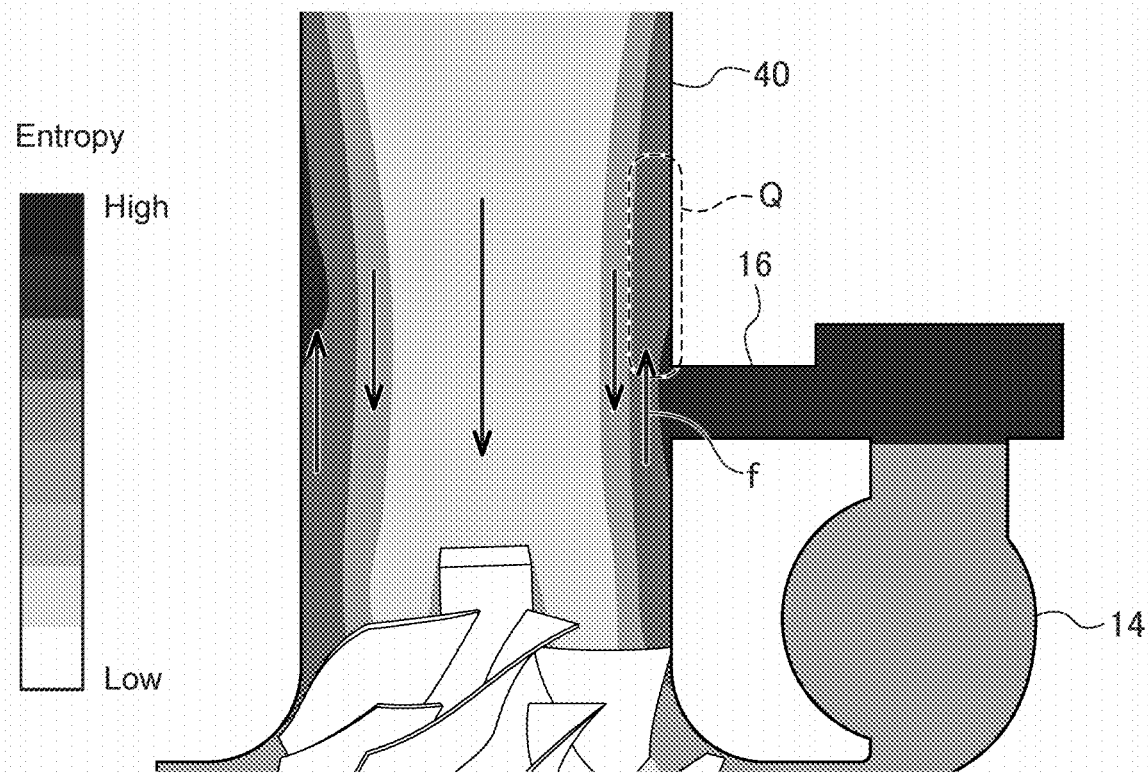
FIG. 6 is a diagram showing the swirling flow f flowing back from the impeller 6 and entropy of the compressor inlet pipe 40 near the surge line in the centrifugal compressor 4 according to an embodiment.
Figure 7:
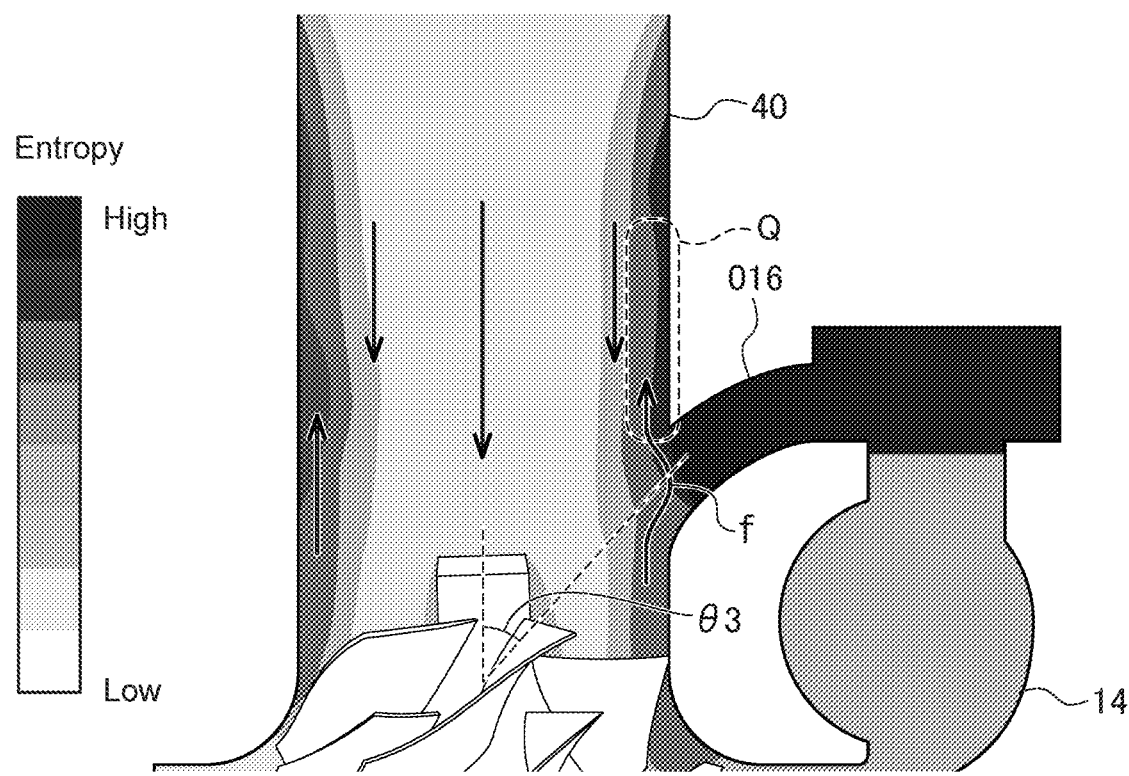
FIG. 7 is a diagram showing the swirling flow f flowing back from the impeller 6 and entropy of the compressor inlet pipe 40 near the surge line in the centrifugal compressor 4 according to a conventional embodiment.
Figure 8:
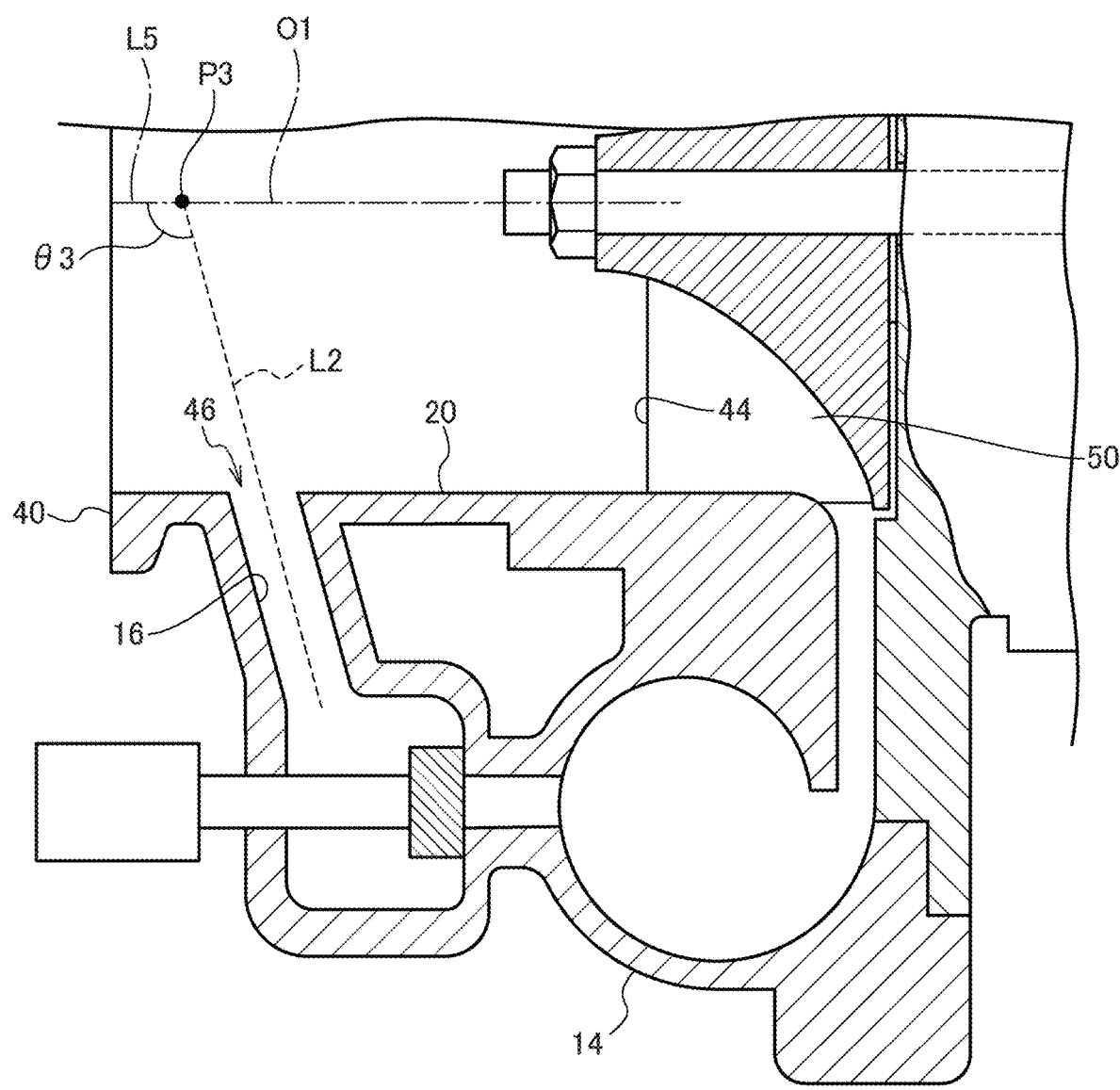
FIG. 8 is a partial meridian view of the centrifugal compressor 4 for showing another configuration example of the bypass passage 16.

FIG. 5 is a partial enlarged view of the centrifugal compressor 4 shown in FIG. 1. FIG. 6 is a diagram showing the swirling flow f flowing back from the impeller 6 and entropy of the compressor inlet pipe 40 near the surge line in the centrifugal compressor 4 according to an embodiment. FIG. 7 is a diagram showing the swirling flow f flowing back from the impeller 6 and entropy of the compressor inlet pipe 40 near the surge line in the centrifugal compressor 4 according to a conventional embodiment.

In an embodiment, for example as shown in FIG. 5, when, in a meridian plane of the centrifugal compressor 4 (cross-section including axis O1 of compressor inlet pipe 40), P3 is an intersection between the axis O1 of the compressor inlet pipe 40 and the tangent line L2, L5 is a line segment of the axis O1 of the compressor inlet pipe 40 extending from the intersection P3 upstream in the flow direction F of the compressor inlet pipe 40 (flow direction perpendicular to flow passage cross-section of compressor inlet pipe 40), and L6 is a half-line of the tangent line L2 extending from the intersection P3 into the bypass passage 16, the angle $\theta 3$ between the line segment L5 and the half-line L6 at the intersection P3 is equal to or greater than 90°.

With this configuration, as compared with the conventional embodiment shown in FIG. 7 where the angle $\theta 3$ is smaller than 90°, as shown in FIG. 6, the entry of the swirling flow f (swirl) flowing back from the impeller 6 into the bypass passage is prevented. Thus, as compared with the conventional embodiment shown in FIG. 7, as shown in FIG. 6, it is possible to suppress an increase in pressure loss in a region Q in the vicinity of the connection portion between the compressor inlet pipe 40 and the bypass passage 16. Consequently, it is possible to suppress a reduction in compressor efficiency.

Conventionally, as shown in FIG. 7, the angle $\theta 3$ is set to be smaller than 90° in order to prevent the forward flow toward the impeller 6 in the compressor inlet pipe 40 from interfering with the bypass passage 16. However, as a result of studies by the inventors, it has been found that it is preferred in terms of the compressor efficiency to set the angle $\theta 3$ related to the bypass passage 16 to be equal to or greater than 90° in order to prevent the entry of the swirling flow f flowing back from the impeller 6 into the bypass passage 16, rather than set the angle $\theta 3$ to be smaller than 90° in order to prevent the forward flow toward the impeller 6 from interfering with the bypass passage 16.

Figure 12:
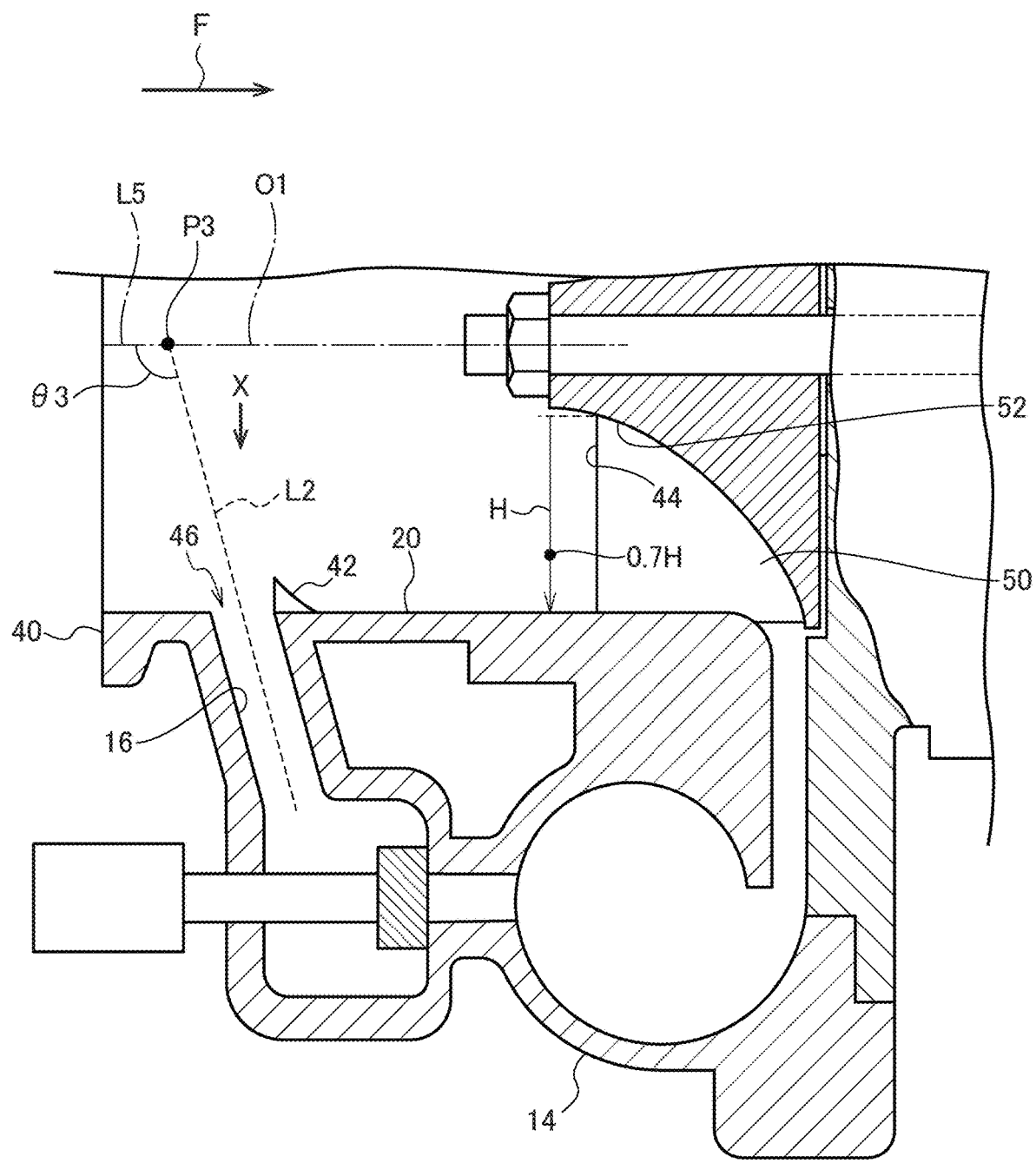
FIG. 12 is a partial meridian view of the centrifugal compressor 4 for showing another configuration example of the compressor inlet pipe 40.
Figure 13:
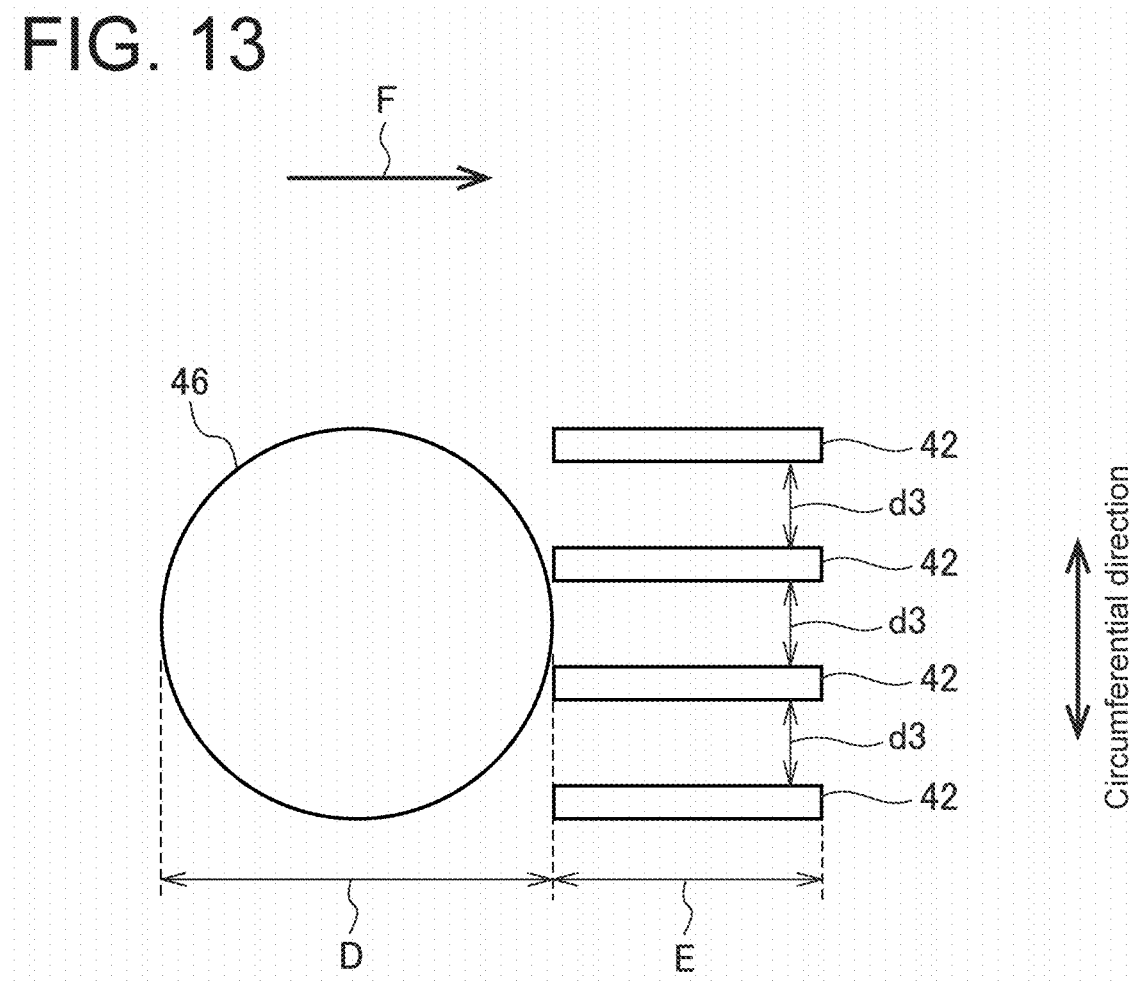
FIG. 13 is a view in a direction of arrow X in FIG. 12.
Figure 14:
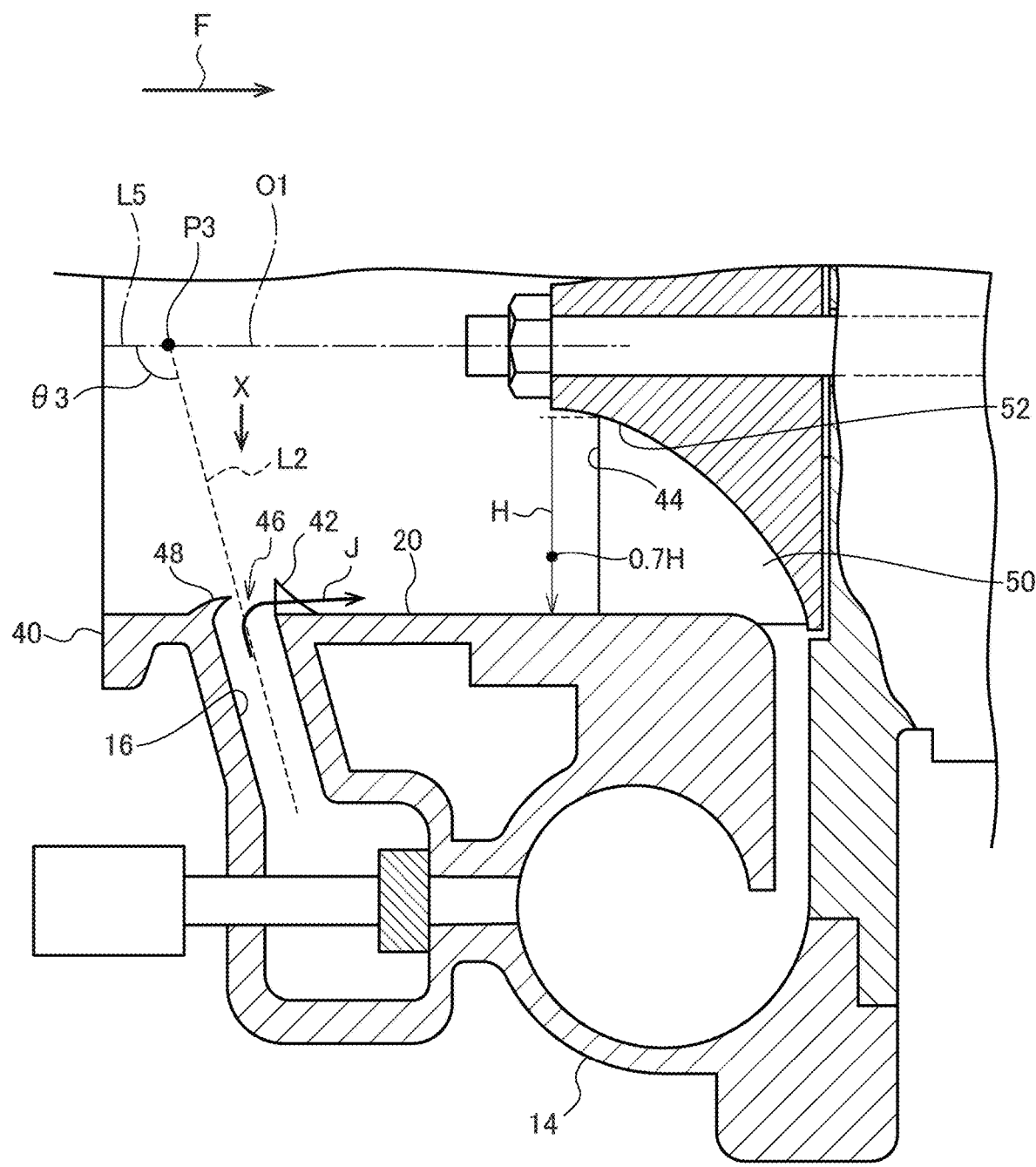
FIG. 14 is a partial meridian view of the centrifugal compressor 4 for showing another configuration example of the compressor inlet pipe 40.
Figure 15:
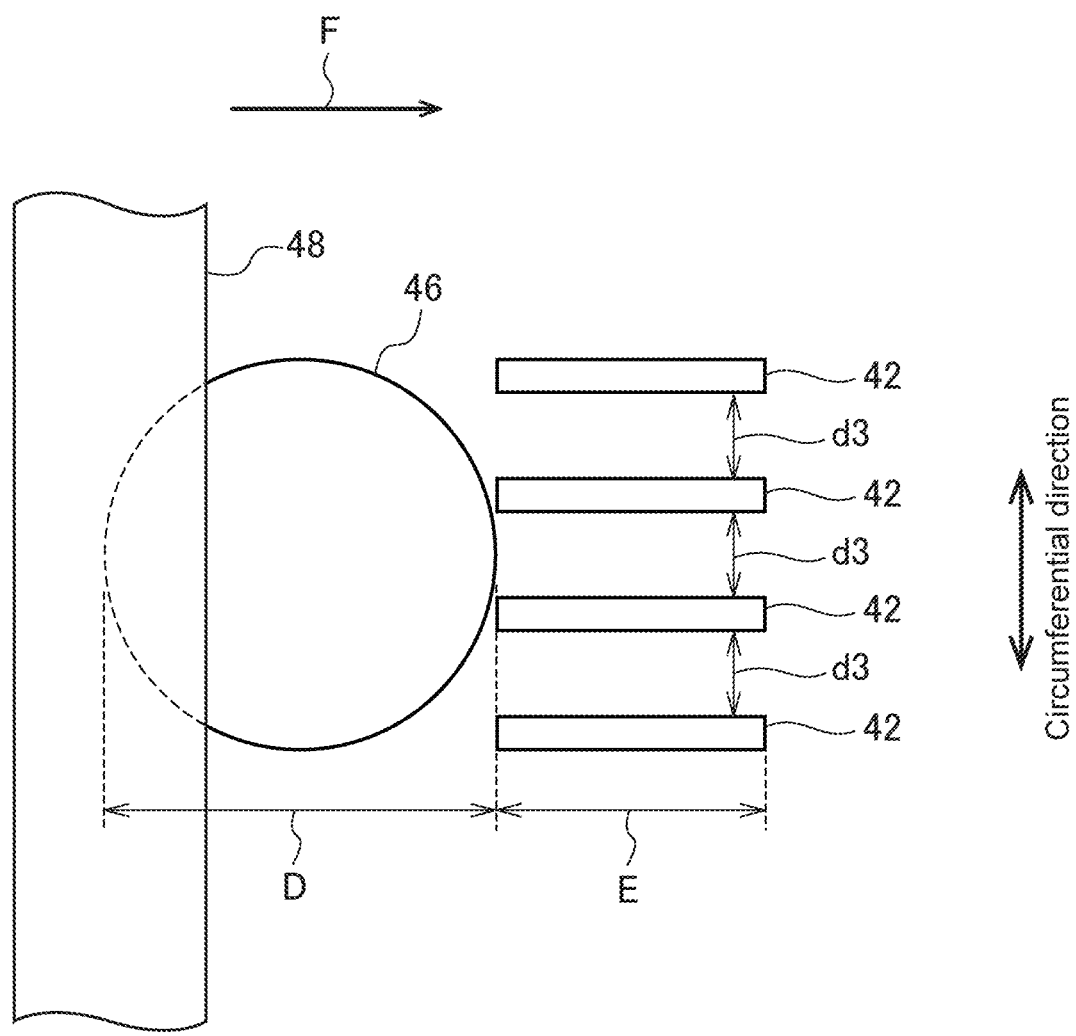
FIG. 15 is a view in a direction of arrow X in FIG. 14.
Figure 16:
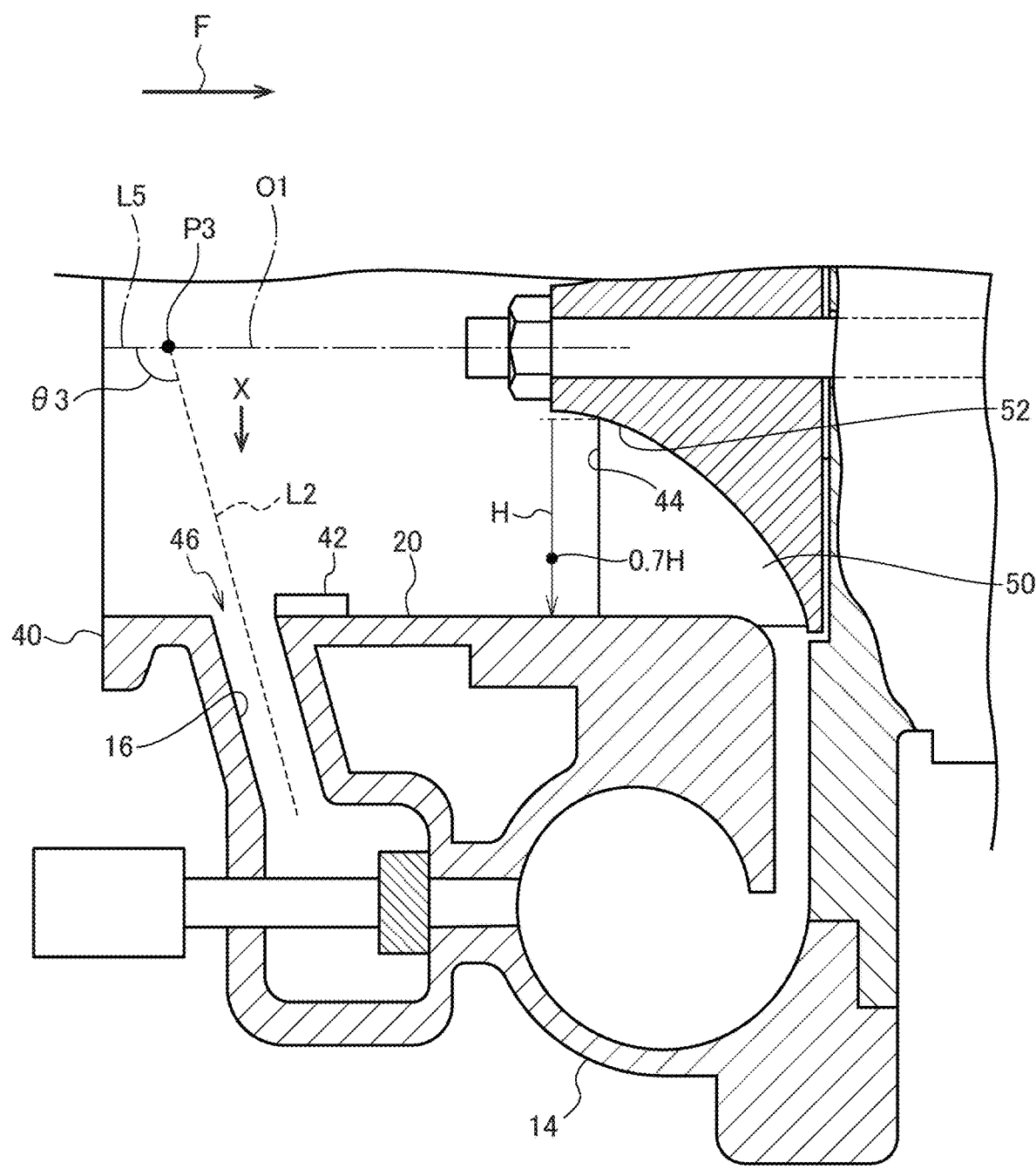
FIG. 16 is a partial meridian view of the centrifugal compressor 4 for showing another configuration example of the compressor inlet pipe 40.

FIG. 12 is a partial meridian view of the centrifugal compressor 4 for showing another configuration example of the compressor inlet pipe 40. FIG. 13 is a view in a direction of arrow X in FIG. 12. FIG. 14 is a partial meridian view of the centrifugal compressor 4 for showing another configuration example of the compressor inlet pipe 40. FIG. 15 is a view in a direction of arrow X in FIG. 14. FIG. 16 is a partial meridian view of the centrifugal compressor 4 for showing another configuration example of the compressor inlet pipe 40.

In some embodiments, for example as shown in FIGS. 8, 12, 14, and 16, in a meridian plane of the centrifugal compressor 4 (cross-section including axis O1 of compressor inlet pipe 40), the angle $\theta 3$ satisfies $90° \leq \theta 3$.

With the above configuration, as compared with the conventional embodiment where the angle $\theta 3$ is smaller than 90°, the angle $\theta 3$ is set so as to prevent the entry of the swirling flow flowing back from the impeller 6 into the bypass passage 16 in an operating region near the surge line. Further, the distance between the impeller 6 and the connection port of the bypass passage 16 on the inner wall surface of the compressor inlet pipe 40 is easily ensured. Thus, it is possible to prevent the entry of the swirling flow flowing back from the impeller 6 into the bypass passage 16 in an operating region near the surge line, and reduce pressure loss in a region in the vicinity of the connection portion between the compressor inlet pipe 40 and the bypass passage 16.

Conventionally, the angle $\theta 3$ is set to be smaller than 90° in order to prevent the forward flow toward the impeller 6 in the compressor inlet pipe 40 from interfering with the bypass passage 16. However, as a result of studies by the inventors, it has been found that it is preferred in terms of the compressor efficiency to set the angle $\theta 3$ related to the bypass passage 16 to be greater than 90° in order to prevent the entry of the swirling flow flowing back from the impeller 6 into the bypass passage 16 near the surge line, rather than set the angle $\theta 3$ to be smaller than 90° in order to prevent the forward flow toward the impeller 6 from interfering with the bypass passage 16.

In some embodiments, for example as shown in FIGS. 8, 12, 14, and 16, the angle $\theta 3$ satisfies $\theta 3 \leq 135°$.

With the above configuration, it is possible to prevent the entry of the swirling flow flowing back from the impeller 6 into the bypass passage 16 near the surge line, without excessively increasing the influence of interference of the forward flow toward the impeller 6 in the compressor inlet pipe 40 with the bypass passage 16. Accordingly, it is possible to achieve a high compressor efficiency.

In some embodiments, for example as shown in FIGS. 12 to 16, the centrifugal compressor further includes at least one extension part 42 which is disposed between a leading edge 44 of a blade 50 of the impeller 6 and a connection port 46 of the bypass passage 16 formed on the compressor inlet pipe 40 in the axial direction of the compressor inlet pipe 40, and extends along a direction parallel to the axis O1 so as to protrude from the inner wall surface 20 of the compressor inlet pipe 40 inward in the radial direction of the compressor inlet pipe 40.

With the above configuration, the extension part 42 prevents the entry of the swirling flow flowing back from the impeller 6 into the bypass passage 16 near the surge line. Further, since the extension part 42 extends along the direction parallel to the axis O1 (direction parallel to flow direction F), the forward flow toward the impeller 6 in the compressor inlet pipe 40 smoothly flows along the extension part 42. Thus, it is possible to effectively reduce pressure loss in a region in the vicinity of the connection portion between the compressor inlet pipe 40 and the bypass passage 16.

In some embodiments, for example as shown in FIGS. 13 and 15, the at least one extension part 42 includes a plurality of extension parts 42 arranged at intervals in the circumferential direction of the compressor inlet pipe 40.

With the above configuration, the plurality of extension parts 42 effectively prevents the entry of the swirling flow flowing back from the impeller 6 into the bypass passage 16 near the surge line.

In some embodiments, for example as shown in FIGS. 12, 14, and 16, when H is a blade height of the leading edge 44 of the blade 50 of the impeller 6 (blade height from hub surface 52), each extension part 42 is formed only outside of the position of 70% blade height H (0.7 H blade height from hub surface 52) in the radial direction of the compressor inlet pipe 40, and is not formed inside of the position of 70% blade height H in the radial direction of the compressor inlet pipe 40.

With the above configuration, the influence of the extension part 42 on the forward flow toward the impeller 6 in the compressor inlet pipe 40 can be reduced while preventing the entry of the swirling flow flowing back from the impeller 6 into the bypass passage 16 near the surge line by the extension part 42.

In some embodiments, for example as shown in FIGS. 13 and 15, when d3 is a pitch of the plurality of extension parts 42 in the circumferential direction of the compressor inlet pipe 40, E is a length of each extension part 42 in a direction parallel to the axis O1 (direction parallel to flow direction F), and D is an outer diameter of the connection port 46 of the bypass passage 16, E>d3 is satisfied.

With the above configuration, it is possible to prevent the entry of the swirling flow flowing back from the impeller 6 into the bypass passage 16 near the surge line, regardless of the angle of swirling flow.

In some embodiments, for example as shown in FIGS. 12 to 16, each extension part 42 is formed in a plate shape. The shape of the extension part in a meridian plane of the centrifugal compressor 4 is not limited to a particular shape, and may be substantially triangle as shown in FIGS. 12 and 14 or rectangular as shown in FIG. 16.

With the above configuration, the plate-shaped extension part 42 effectively prevents the entry of the swirling flow flowing back from the impeller 6 into the bypass passage 16 near the surge line.

In some embodiments, for example as shown in FIGS. 14 and 15, the centrifugal compressor includes an annular protruding part 48 protruding downstream in the flow direction F of the compressor inlet pipe 40 from an upstream part of the inner wall surface 20 of the compressor inlet pipe 40 upstream of the connection port 46 of the bypass passage 16 in the flow direction F.

With the above configuration, the flow (re-circulation flow) J flowing out from the bypass passage 16 into the compressor inlet pipe 40 via the connection port 46 is turned by the annular protruding part 48 and flows along the inner wall surface 20 of the compressor inlet pipe 40. Thus, it is possible to suppress the backflow from the impeller 6 near the surge line.

In some embodiments, for example as shown in FIG. 15, the protruding part 48 is disposed so as to overlap at least a part of the connection port 46 when viewed in the radial direction of the compressor inlet pipe 40 (view in direction of arrow X in FIG. 14).

With the above configuration, as shown in FIG. 14, the flow J (re-circulation flow) flowing out from the bypass passage 16 into the compressor inlet pipe 40 via the connection port 46 is effectively turned by the annular protruding part 48 and flows along the inner wall surface 20 of the compressor inlet pipe 40. Thus, it is possible to effectively suppress the backflow from the impeller 6 near the surge line.

The present invention is not limited to the embodiments described above, but includes modifications to the embodiments described above, and embodiments composed of combinations of those embodiments.

Figure 9:
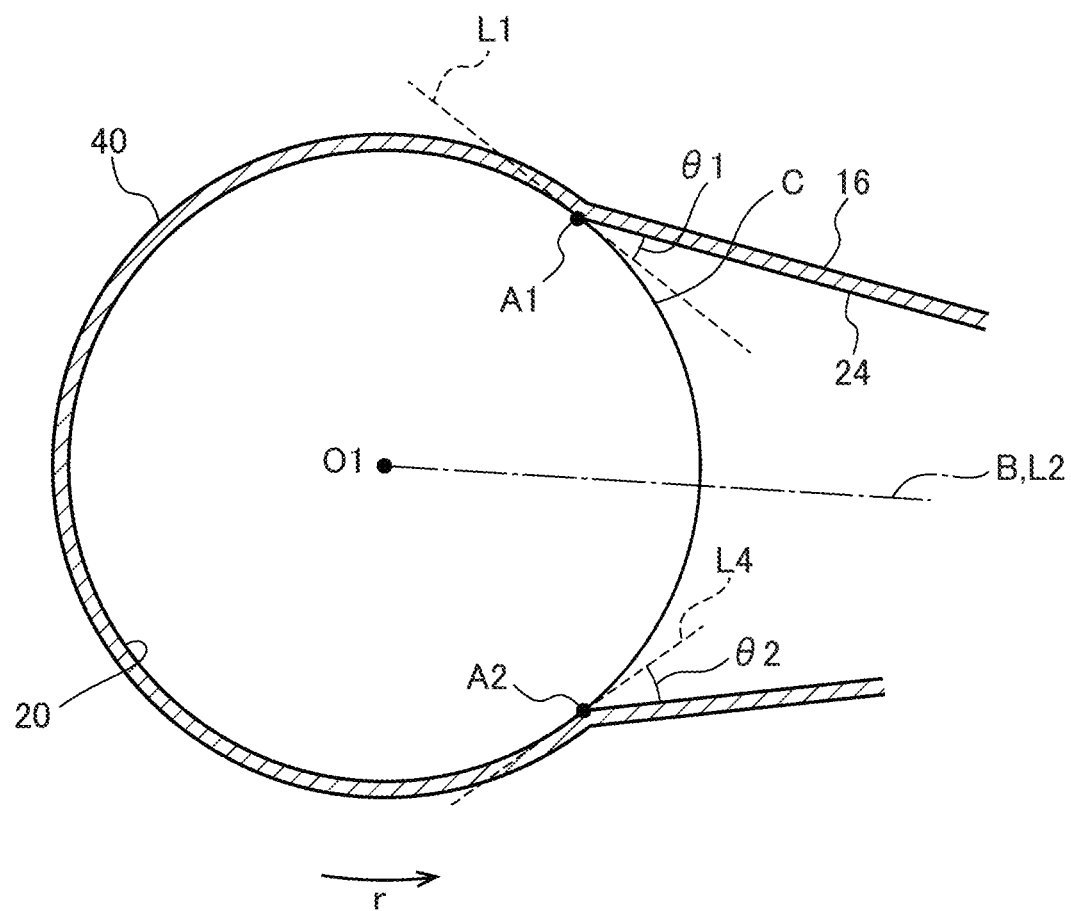
FIG. 9 is a diagram schematically showing an example of X-X cross-section (cross-section perpendicular to axis O1 of compressor inlet pipe 40) of the centrifugal compressor 4 shown in FIG. 1.

For example, in the embodiment shown in FIG. 3, the bypass passage 16 is eccentric with respect to the axis O1 of the compressor inlet pipe, but in other embodiments, for example as shown in FIG. 9, the axis O1 of the compressor inlet pipe 40 may be positioned on the tangent line L2, and the angle θ1 may be equal to the angle θ3. That is, it suffices when the inner wall surface 24 of the bypass passage 16 is formed from the connection portion A1 along the tangent line L1 in order to suppress local deceleration of the swirling flow f flowing back from the impeller 6 due to impingement of the swirling flow f on the inner wall surface 24 of the bypass passage 16.

REFERENCE SIGNS LIST

2 Turbocharger
4 Centrifugal compressor
6 Impeller
8 Rotational shaft
10 Turbine rotor
12 Turbine
14 Scroll passage
16 Bypass passage
18 Bypass valve
19 Actuator
20 Inner wall surface
22 Valve port
24 Inner wall surface
38 Outlet pipe
40 Compressor inlet pipe
42 Extension part
44 Leading edge
46 Connection port
48 Protruding part
50 Blade
52 Hub surface

The invention claimed is:
1. A centrifugal compressor, comprising:
an impeller;
a compressor inlet pipe for guiding air to the impeller;
a scroll passage disposed on an outer peripheral side of the impeller; and
a bypass passage connecting the compressor inlet pipe and the scroll passage and bypassing the impeller,
wherein, in a cross-section perpendicular to an axis of the compressor inlet pipe, when A1 is a connection portion on a downstream side in a rotational direction of the impeller of connection portions between an inner wall surface of the compressor inlet pipe and an inner wall surface of the bypass passage, C is a virtual circle constituting the inner wall surface of the compressor inlet pipe, and L1 is a tangent line of the virtual circle

C at the connection portion A1, the inner wall surface of the bypass passage is formed from the connection portion A1 along the tangent line L1;

wherein, in a cross-section perpendicular to the axis of the compressor inlet pipe, when A2 is a connection portion on an upstream side in the rotational direction of the impeller of connection portions between the virtual circle C and the inner wall surface of the bypass passage, and L4 is a tangent line of the virtual circle at the connection portion A2, an angle θ2 between the inner wall surface of the bypass passage and the tangent line L4 satisfies 45°≤θ2≤90°.

2. The centrifugal compressor according to claim 1, wherein, when

B is a virtual line connecting centers of gravity of cross-sections of the bypass passage in a flow direction of the bypass passage, and in a cross-section perpendicular to the axis of the compressor inlet pipe, P1 is an intersection between the virtual circle C and the virtual line B, L2 is a tangent line of the virtual line B at the intersection P1, L3 is a straight line passing through the axis of the compressor inlet pipe and parallel to the tangent line L2, and P2 is an intersection between the virtual circle C and the straight line L3, the intersection P1 is positioned downstream of the intersection P2 in the rotational direction of the impeller.

3. The centrifugal compressor according to claim 1, wherein, when

B is a virtual line connecting centers of gravity of cross-sections of the bypass passage in a flow direction of the bypass passage, and in a cross-section perpendicular to the axis of the compressor inlet pipe, P1 is an intersection between the virtual circle C and the virtual line B, and A2 is a connection portion on an upstream side in the rotational direction of the impeller of connection portions between the virtual circle C and the inner wall surface of the bypass passage, a distance from the connection portion A1 to the intersection P1 along the virtual circle is greater than a distance from the connection portion A2 to the intersection P1 along the virtual circle.

4. The centrifugal compressor according to claim 1, wherein, in a cross-section perpendicular to the axis of the compressor inlet pipe, an angle θ1 between the inner wall surface of the bypass passage and the tangent line L1 at the connection portion A1 satisfies 0°≤θ1≤45°.

5. The centrifugal compressor according to claim 1, wherein, in a cross-section perpendicular to the axis of the compressor inlet pipe, when θ1 is an angle between the inner wall surface of the bypass passage and the tangent line L1 at the connection portion A1, A2 is a connection portion on an upstream side in the rotational direction of the impeller of connection portions between the virtual circle C and the inner wall surface of the bypass passage, L4 is a tangent line of the virtual circle at the connection portion A2, and θ2 is an angle between the inner wall surface of the bypass passage and the tangent line L4 at the connection portion A2, θ1<θ2 is satisfied.

6. A turbocharger, comprising:
the centrifugal compressor according to claim 1; and
a turbine sharing a rotational shaft with the impeller of the centrifugal compressor.

7. A centrifugal compressor, comprising:
an impeller;
a compressor inlet pipe for guiding air to the impeller;
a scroll passage disposed on an outer peripheral side of the impeller and
a bypass passage connecting the compressor inlet pipe and the scroll passage and bypassing the impeller, wherein, in a cross-section perpendicular to an axis of the compressor inlet pipe, when A1 is a connection portion on a downstream side in a rotational direction of the impeller of connection portions between an inner wall surface of the compressor inlet pipe and an inner wall surface of the bypass passage, C is a virtual circle constituting the inner wall surface of the compressor inlet pipe and L1 is a tangent line of the virtual circle C at the connection portion A1, the inner wall surface of the bypass passage is formed from the connection portion A1 along the tangent line L1, wherein, when B is a virtual line connecting centers of gravity of cross-sections of the bypass passage in a flow direction of the bypass passage, in a cross-section perpendicular to a rotational axis of the impeller, P1 is an intersection between the virtual circle C and the virtual line B, and L2 is a tangent line of the virtual line B at the intersection P1, and in a meridian plane of the centrifugal compressor, P3 is an intersection between the axis O1 of the compressor inlet pipe and the tangent line L2, L5 is a line segment of the axis O1 of the compressor inlet pipe extending from the intersection P3 upstream in a flow direction of the compressor inlet pipe, and L6 is a half-line of the tangent line L2 extending from the intersection P3 into the bypass passage, an angle θ3 between the line segment L5 and the half-line L6 at the intersection P3 is equal to or greater than 90°.

8. A centrifugal compressor, comprising:
an impeller;
a compressor inlet pipe for guiding air to the impeller;
a scroll passage disposed on an outer peripheral side of the impeller; and
a bypass passage connecting the compressor inlet pipe and the scroll passage and bypassing the impeller,
wherein, when B is a virtual line connecting centers of gravity of cross-sections of the bypass passage in a flow direction of the bypass passage, in a cross-section perpendicular to a rotational axis of the impeller, C is a virtual circle constituting an inner wall surface of the compressor inlet pipe, P1 is an intersection between the virtual circle C and the virtual line B, and L2 is a tangent line of the virtual line B at the intersection P1, and in a meridian plane of the centrifugal compressor, P3 is an intersection between the axis O1 of the compressor inlet pipe and the tangent line L2, L5 is a line segment of the axis O1 of the compressor inlet pipe extending from the intersection P3 upstream in a flow direction of the compressor inlet pipe, and L6 is a half-line of the tangent line L2 extending from the intersection P3 into the bypass passage, an angle θ3 between the line segment L5 and the half-line L6 at the intersection P3 satisfies 90°<θ3.

9. The centrifugal compressor according to claim 8, wherein the angle θ3 satisfies θ3≤135°.

10. The centrifugal compressor according to claim 8, further comprising at least one extension part disposed between a leading edge of a blade of the impeller and a connection port of the bypass passage formed on the compressor inlet pipe in an axial direction of the compressor inlet pipe, the at least one extension part extending along a direction parallel to the axis O1 so as to protrude from the inner wall surface of the compressor inlet pipe inward in a radial direction of the compressor inlet pipe.

11. The centrifugal compressor according to claim 10, wherein the at least one extension part includes a plurality of extension parts arranged at intervals in a circumferential direction of the compressor inlet pipe.

12. The centrifugal compressor according to claim 10, wherein each extension part is formed in a plate shape.

13. The centrifugal compressor according to claim 8, further comprising an annular protruding part protruding downstream in the flow direction of the compressor inlet pipe from an upstream part of the inner wall surface of the compressor inlet pipe upstream of a connection port of the bypass passage in the flow direction.

14. The centrifugal compressor according to claim 13, wherein the protruding part is disposed so as to overlap at least a part of the connection port when viewed in a radial direction of the compressor inlet pipe.

15. A turbocharger, comprising:
the centrifugal compressor according to claim 8; and
a turbine sharing a rotational shaft with the impeller of the centrifugal compressor.

16. The centrifugal compressor according to claim 8, wherein the bypass passage is configured to flow a part of the compressed air in the scroll passage back to the compressor inlet pipe,
wherein a connection port of the bypass passage is formed in the compressor inlet pipe and a downstream end of the periphery of the connection port, which is the most downstream end in the axial direction of the compressor inlet pipe, is located upstream of a leading edge of a blade of the impeller.

17. A centrifugal compressor, comprising:
an impeller;
a compressor inlet pipe for guiding air to the impeller;
a scroll passage disposed on an outer peripheral side of the impeller; and
a bypass passage connecting the compressor inlet pipe and the scroll passage and bypassing the impeller,
wherein, in a cross-section perpendicular to an axis of the compressor inlet pipe, when A1 is a connection portion on a downstream side in a rotational direction of the impeller of connection portions between an inner wall surface of the compressor inlet pipe and an inner wall surface of the bypass passage, C is a virtual circle constituting the inner wall surface of the compressor inlet pipe, and L1 is a tangent line of the virtual circle C at the connection portion A1, the inner wall surface of the bypass passage is formed from the connection portion A1 along the tangent line L1,
wherein, in a cross-section perpendicular to an axis of the compressor inlet pipe, A2 is a connection portion on an upstream side in the rotational direction of the impeller of connection portions between the virtual circle C and the inner wall surface of the bypass passage, P1 is an intersection between the virtual circle C and the virtual line B, and L2 is a tangent line of the virtual line B at the intersection P1, the axis O1 of the compressor inlet pipe is located between a straight line that passes through the connection portion A1 and is parallel to the tangent line L2 and a straight line that passes through the connection portion A2 and is parallel to the tangent line L2.

* * * * *